Feb. 11, 1930.　　　　F. E. KEY　　　　1,746,535
METHOD OF JIGGING AND ASSEMBLING RETURN BEND FITTINGS
Filed Sept. 10, 1928
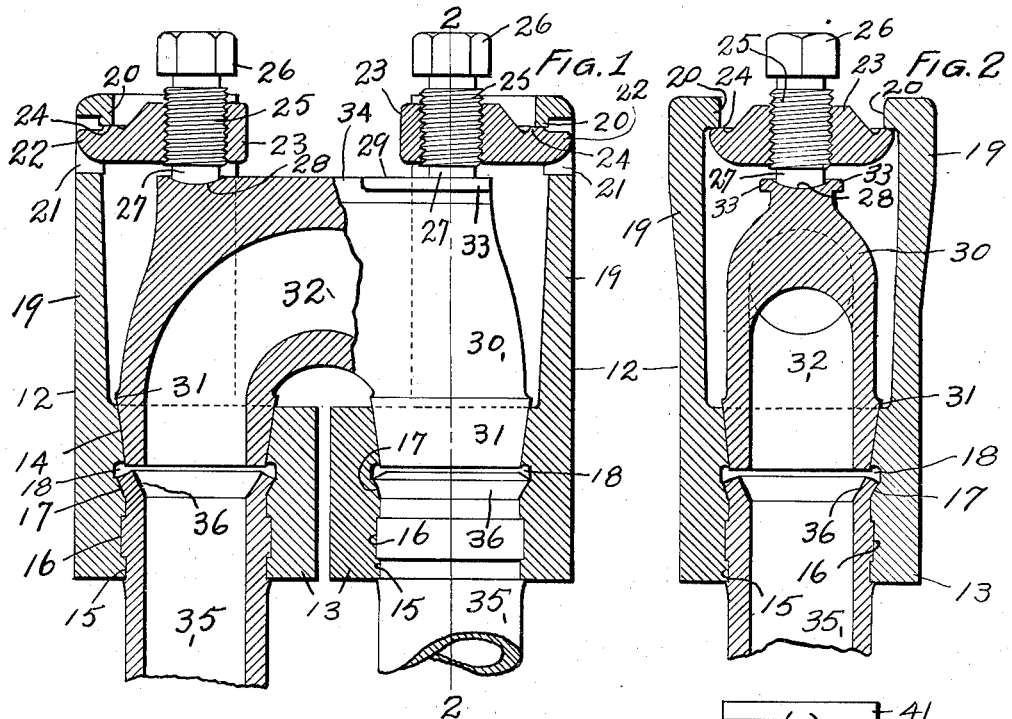
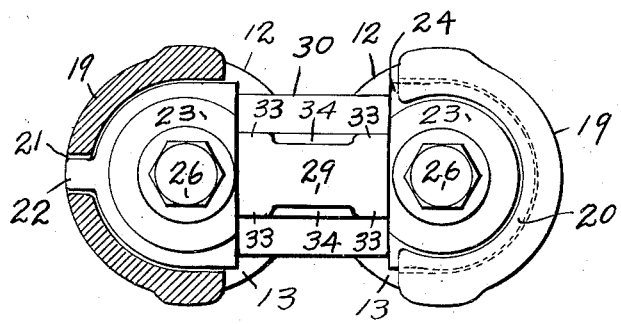
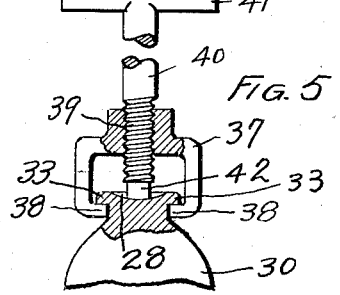
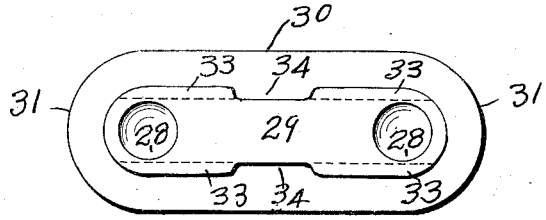
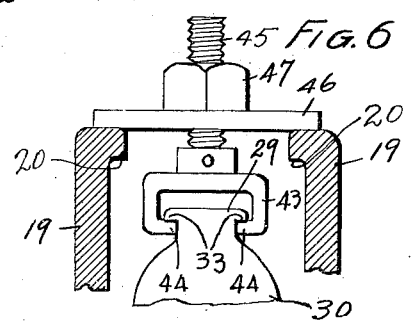
INVENTOR
FREDERICK E. KEY
By Edward E. Longan
ATTY.

Feb. 11, 1930.  F. E. KEY  1,746,535
METHOD OF JIGGING AND ASSEMBLING RETURN BEND FITTINGS
Filed Sept. 10, 1928  2 Sheets-Sheet 2
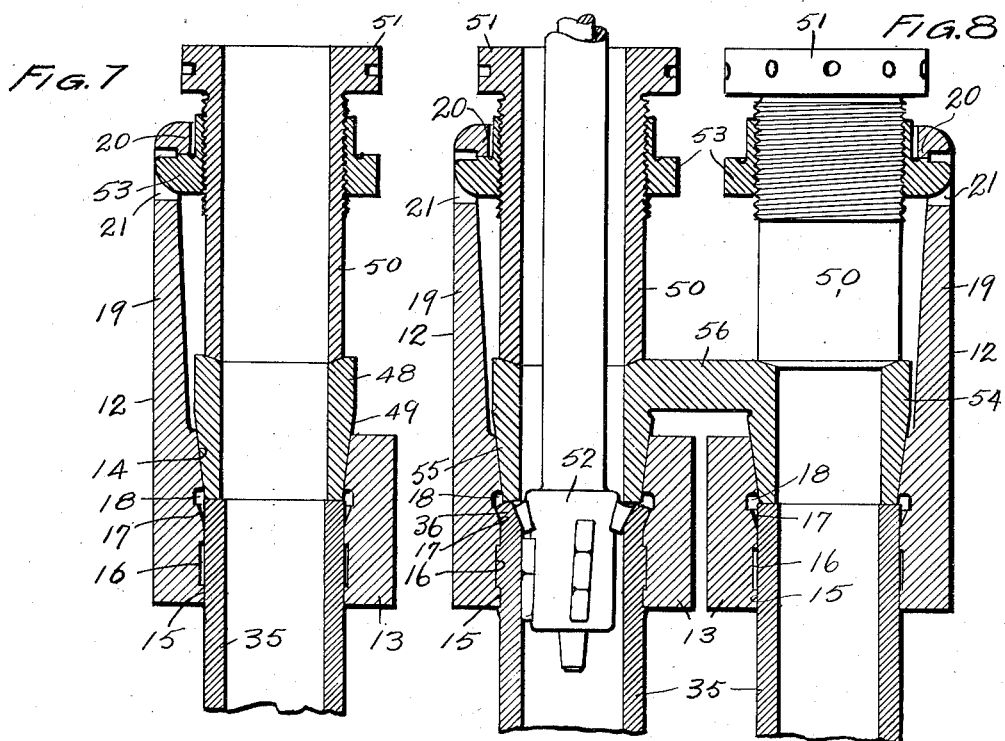
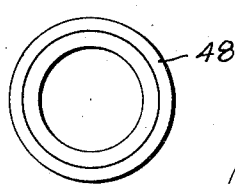
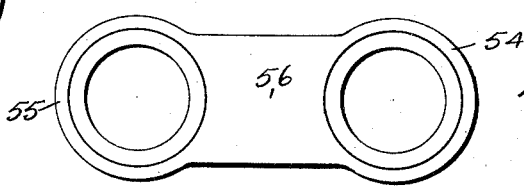
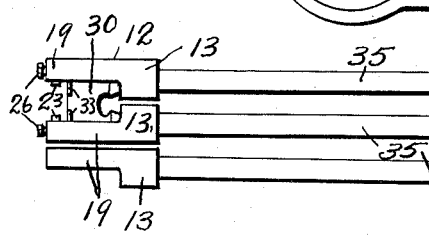
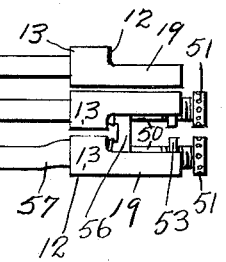
INVENTOR
FREDERICK E. KEY
By Edward E. Longan
ATTY.

Patented Feb. 11, 1930

1,746,535

UNITED STATES PATENT OFFICE

FREDERICK E. KEY, OF EAST ST. LOUIS, ILLINOIS, ASSIGNOR TO KEY BOILER EQUIPMENT CO., OF EAST ST. LOUIS, ILLINOIS, A CORPORATION OF MISSOURI

METHOD OF JIGGING AND ASSEMBLING RETURN-BEND FITTINGS

Application filed September 10, 1928. Serial No. 304,976.

My invention relates to improvements in method of jigging and assembling return bend fittings and has for its primary object a return bend which is so constructed that it can be easily handled with tools thereby permitting a return bend to be removed and replaced without first cooling the same.

A further object is the method of jigging return bend fittings prior to securing tubes therein so that when the tubes are secured, the fittings will be properly aligned for the insertion of a return bend.

A still further object is to construct a jig for assembling return bend fittings on tubes which will not only properly align adjacent fittings but which will also regulate and limit the depth of insertion of the tubes in the fitting.

In the drawings:

Fig. 1 is a vertical longitudinal section of a pair of fittings with a return bend in position, parts of the return bend being broken away and in section.

Fig. 2 is a cross section taken on the line 2—2 of Fig. 1.

Fig. 3 is a top plan view of Fig. 1 with parts of one of the fittings broken away and in section.

Fig. 4 is a top plan view of a return bend.

Fig. 5 is a view with parts broken away and in section of the return bend handling tool made use of showing the same attached to the upper part of a return bend.

Fig. 6 is a fragmental view of the upper portion of a return bend and its fittings showing the removing tool attached thereto.

Fig. 7 is a vertical section of a return bend fitting or sleeve showing the jig employed when only one fitting is to be attached to a tube.

Fig. 8 is a vertical section taken through a pair of adjacent fittings showing the jig made use of for rolling in the tubes and simultaneously aligning the same.

Fig. 9 is a top plan view of the lower portion of the jig made use of in Fig. 7.

Fig. 10 is a top plan view of the lower portion of the jig made use of in Fig. 8; and Fig. 11 is a diagrammatic view of several tubes with the sleeves attached thereto and illustrating the manner in which a tube out of alignment is permanently kinked so as to prevent subsequent misalignment of adjacent sleeves.

In the construction of my device I employ a sleeve 12. This sleeve has a cylindrical lower portion 13. In the upper part of the portion 13 is formed a tapered opening 14 and in the lower portion a cylindrical opening 15. This cylindrical opening has a part intermediate its ends enlarged or grooved out as indicated by the numeral 16 and its upper portion 17 flared upwardly and outwardly. Between the tapered opening or return bend seat 14 and the tapered portion 17 of the opening 15 is a relief chamber 18.

Extending upward from the portion 13 is a portion 19 which is preferably semi-cylindrical and which is provided with an inwardly projecting flange 20. The portion 19 is also provided with an opening 21 into which the tongue 22 of the screw plate 23 extends. The screw plate 23 has a portion 24 engaging with the underside of the flange 20. Passing through the screw plate 23 is a screw 25 which is provided with a head 26. This head is preferably angular so as to form a wrench-engaging surface. The lower portion 27 of the screw 25 is reduced in diameter and is adapted to be received by or enter the depression 28 formed in the upper portion 29 of the return bend 30. The return bend is substantially U shaped in cross section and is provided at its lower ends or legs with tapered portions 31, which are of the same taper as the opening 14. The return bend is provided with a U shaped passage 32 so that when the bend is in position, that is secured into adjacent sleeves or fittings, a continuous passage between the two is obtained.

The upper portion 29 is provided with outwardly extending ribs 33. These ribs extend only a predetermined distance from each end toward the center leaving a reduced portion 34 between them. These ribs, as will be noted from Figs. 2, 5 and 6, form a T shaped head adjacent each end of the top of the return bend and afford a grip for the handling tool or the removing tool, as will be explained in detail later.

35 represents a tube which is rolled into the sleeve. This tube, as will be seen from the various figures, is expanded so as to tightly fit into the bore 15 and the recessed or grooved portion 16. The upper portion 36 of the tube is flared outward conforming to the tapered or flared portion 17, and in this way any longitudinal movement of the tube in the sleeve is prevented.

It will also be noted from the drawings that the tapered portion 31 of the return bend does not contact with the end of the tube. This is essential because if a space were not left between the tapered portion 31 of the return bend and the end of the tube, it would be impossible to tightly seat the return bend so as to prevent leakage. The handling tool for the return bend is constructed as follows: I have a yoke member 37, which is substantially U shaped in cross section and which has its lower ends 38 inturned so that they can be slipped under the ribs 33. The yoke is provided with a screw threaded bore 39 through which the screw threaded end of a rod 40 passes. This rod 40 is preferably provided on its upper end with a cross bar 41, which not alone serves as a handle but permits ready turning of the rod 40. The lower end of the rod 40 is reduced in diameter as at 42, which end is adapted to seat itself in the recess 28 formed in the top of the return bend and by sliding the yoke 37 over so that the ends 38 will engage underneath the ribs 33 and then tightening down the rod 40 a temporary rigid connection can be made between these members and by employing two rods of the same type as illustrated in Fig. 5, a hot return bend can be easily handled.

In the event that the return bend sticks in the seat, I have constructed a removing device, which consists of a U shaped member 43, which has in-turned ends 44. The U shaped member 43 has projecting upward therefrom a screw threaded rod 45 which passes freely through a bar 46 and which is adapted to receive a nut 47. When a return bend is stuck or becomes hard to remove, due to coking or similar reasons, the U shaped member 43 is applied to the return bend in the same manner as the yoke 37. The bar 46 is placed on top of the cylindrical projection 20 and then the nut 47 turned so that it will move downward on the rod 45. This exerts an upward pull on the return bend and by applying sufficient pressure or turning power on the nut, the tapered portion of the return bend will be gradually forced or lifted out of its seat, at least sufficiently to break any bond which might exist between the seat and the tapered portion of the return bend. After the return bend has been thus loosened, the handling device is applied and the return bend can be readily removed. In this way all necessity of hammering the return bend to break the bond is eliminated and furthermore a hot return bend can be easily removed from the sleeves which it connects thereby saving considerable time as heretofore it was necessary to cool these return bends to a considerable extent before they could be handled.

In Figs. 7 and 8 I have shown the manner of jigging the return bend sleeves, Fig. 7 showing the manner of jigging one sleeve so that it can be secured to a tube. The jig consists of a hollow member or bushing 48 which is provided with a tapered portion 49, this tapered portion being of the exact taper as the tapered bore or opening 14 formed in the cylindrical portion 13 of the sleeve. The hollow member or bushing 48, however, is made longer than the tapered portion 31 of the return bend so as to afford an abutment for the end of the tube 35 when it is first inserted and prior to being rolled in.

The bushing 48 is secured in position by means of a hollow screw 50 which is provided with a head 51. This head may be either arranged to receive a spanner wrench as illustrated in the drawings, or it may be made angular. The bore through the screw, as well as the bore through the bushing, is made of such diameter as to be slightly larger than the inside diameter of the tube 35 thus permitting the ready insertion of a combined flaring and expanding tool 52 as illustrated in Fig. 8. This tool, however, is not described in detail as there are various types of tools on the market which can be used for this purpose.

The hollow screw 50 is inserted through a screw plate 53, which is carried by the sleeve or fitting 12 in the same manner as the screw plate 23.

In Fig. 8 I have shown a device by means of which the alignment between adjacent fittings or sleeves is fixed prior to rolling in the tubes. In this device members 54 and 55 are employed which are of the same general shape and construction as the hollow member or bushing 48, with this difference however: The hollow members or bushings 48 are contacted by an integrally formed portion or bridge 56, which fixes the alignment of the bores therein so that when this member is placed in position in two adjacent sleeves it will automatically fix or align the centers of the bores in the lower portion thereof. The insertion of the members 54 and 55 and the tightening down thereof by means of the hollow screw will align the sleeves and after these members are secured in position as illustrated in Figs. 7 and 8, the flaring roller 52 is introduced through the bores and into the tube and the expander and flarer is then operated in the usual manner which tightens up the tube in the bore 15 and also simultaneously therewith flares the upper end of the tube and by reason of the member 48 or the members 54 and 55 extending into the cylindrical portion 13 a predetermined distance, the projection of the end of the tube into the cylindrical portion 13 can be regulated to a nicety since all that is necessary is to push the tube into the cylindrical portion until it strikes the end of the hollow member or bushing and then by reason of rolling, which has a tendency to pull the tube toward the hollow member or bushing, this fixed position of the tube is retained.

In Fig. 7 I have illustrated diagrammatically, and in an exaggerated way, what will occur in the event one of the tubes is bent or sprung. In this instance, the portion or end 57 of one of the tubes will be farther away from an adjacent tube than the opposite end of the tube, necessitating the springing of this tube in order to align the same so as to insert the member illustrated in Figs. 8 and 10, and when the tube is rolled in by the expander a short kink, as illustrated, will be set up in that end of the tube. This kink, however, due to the rolling of the tube, will become permanent so that when the jig is finally removed there will be very little, if any, misalignment of the sleeves. By this method of jigging not only are the tubes rolled in the return bend fittings but their projection into the fittings is regulated and, in addition, it is not necessary after they have been once jigged to spring the tubes every time a return bend is to be inserted. In this way a great deal of time in installation is saved, and also a great deal of time in removing and replacing return bends when it has been found necessary to clean out the tubes or bends to remove carbon and other deposits therefrom.

I may, if desired, merely expand the tube in the fitting and then, after removing the jig, flare the upper end of the tube without departing from the spirit of my invention.

Having fully described my invention, what I claim is:—

1. The method of jigging and assembling return bend fittings which consists in inserting and securing in one end of said fitting a hollow jig, inserting a tube in the opposite end of said fitting far enough to contact with said jig, inserting into said tube through said jig an expanding tool, expanding said tube in said fitting, removing said expanding tool, and lastly removing said jig.

2. The method of jigging and assembling return bend fittings which consists inserting the end of a tube in one end of a return bend fitting, securing a hollow jig in the opposite end of said fitting so that its end will contact with the end of said tube so as to limit the projection of the tube into the fitting, inserting an expander through said jig into said tube, expanding said tube so as to secure the same in said fittings, removing said expander, and lastly removing said jig.

3. The method of jigging and assembling return bend fittings which consists in inserting and securing in one end of said fitting a hollow jig, inserting a tube in the opposite end of said fitting for enough to contact with said jig, inserting into said tube through said jig an expanding and flaring tool, expanding said tube in said fitting and simultaneously therewith flaring the end of said tube, removing said expanding tool, and lastly removing said jig.

4. The method of jigging and assembling return bend fittings which consists in inserting the end of a tube in one end of a return bend fitting, securing a hollow jig in the opposite end of said fitting so that its end will contact with the end of said tube and limit the projection of the tube into the fitting, inserting an expander through said jig into said tube, expanding said tube so as to secure the same in said fitting and simultaneously therewith flaring the end of said tube, removing said expander, and lastly removing said jig.

5. The method of jigging and assembling return bend fittings which consists in inserting and securing in one end of said fitting a hollow jig, inserting a tube in the opposite end of said fitting far enough to contact with said jig, inserting into said tube through said jig an expanding tool, expanding said tube in said fitting, removing said expanding tool, removing said jig, and then flaring the end of said tube.

6. The method of jigging and assembling return bend fittings which consists in inserting the end of a tube in one end of a return bend fitting, securing a hollow jig in the opposite end of said fitting so that its end will contact with the end of said tube so as to limit the projection of the tube into the fitting, inserting an expander through said jig into said tube, expanding said tube so as to secure the same in said fitting, removing said expander, removing said jig, and then flaring the end of said tube.

7. The method of jigging and assembling return bend fittings which consists in placing a fitting over the ends of adjacent tubes, inserting and securing a hollow jig in said fittings thereby simultaneously predetermining the distance between the centers of said tubes and limiting the projection thereof into said fittings, inserting an expanding tool through said jig into said tubes sequentially and expanding said tubes in said fittings, removing said expander, and lastly removing said jig.

8. The method of jigging and assembling return bend fittings which consists in placing a fitting over the ends of adjacent tubes, inserting and securing a hollow jig in said fittings thereby simultaneously predetermining the distance between the centers of said tubes and limiting the projection thereof into said fittings, inserting an expanding tool through said jig into said tubes sequentially and expanding said tubes in said fittings, removing said expander, removing said jig, and lastly flaring the end of said tube.

9. The method of jigging and assembling return bend fittings which consists in placing a fitting over the ends of adjacent tubes, inserting and securing a hollow jig in said fittings thereby simultaneously predetermining the distance between the centers of said tubes and limiting the projection thereof into said fittings, inserting an expanding tool through said jig into said tubes sequentially and expanding said tubes in said fittings, removing said expander, removing said jig, and simultaneously flaring the end of said tube.

In testimony whereof I have affixed my signature.

FREDERICK E. KEY.